June 23, 1925.　　　　　　　　　　　　　　　　　　　　1,542,940
E. J. HUGHES
FLANGE JOINT
Filed March 5, 1923

INVENTOR
Edward J. Hughes
BY
ATTORNEY

Patented June 23, 1925.

1,542,940

UNITED STATES PATENT OFFICE.

EDWARD J. HUGHES, OF BLOOMFIELD, NEW JERSEY.

FLANGE JOINT.

Application filed March 5, 1923. Serial No. 622,722.

*To all whom it may concern:*

Be it known that I, EDWARD J. HUGHES, a citizen of the United States, and a resident of Bloomfield, in the county of Essex and State of New Jersey, have invented certain new and useful Improvements in Flange Joints, of which the following is a specification.

This invention relates generally to flange joints and has more particularly reference to an improvement on the so-called Van Stone joint.

Heretofore, in this art, it has been customary to roll over the end of a pipe of ductile iron or steel into a flange of considerable width and to mount collars on the ends of said pipes, which collars are then bolted together. This character of joint is what may be called the standard Van Stone joint and is serviceable for certain purposes, especially when a gasket is interposed between the opposed faces of the laps, and the material used is wrought steel. The disadvantage of this construction, when the material used is wrought genuine iron, is that when it is attempted to roll a lap of standard dimensions, radial fissures invariably appear, the practice being to close these fissures by means of expensive acetylene welding. In consequence of this the rolled over lap is weak even though of a thickness equal to that of the pipe wall, and sometimes results, during shipment, in breakage. In addition, in the attempt to make the lap as strong as possible, an undue amount of pipe length is used up in forming the lap thereby increasing the cost to a considerable extend.

It has also been attempted in this art to shrink a collar on the end of a pipe and to bend, as by hammer welding or rolling, the outer end of the pipe into an interior circumferential groove in the collar. The result of this operation is that the collar is no longer loose on the pipe and therefore, when matching up the bolt holes of collars on adjacent pipe lengths, it is necessary to turn the pipe as well as the collar,—a task of no small magnitude.

The object of this invention is to overcome these difficulties in such way that relatively little of the pipe length is utilized in rolling over a lap whereby a lap sufficiently strong to withstand the strain to which the joints subjected is created. The collar remains loose on the pipe so that bolt holes can be readily matched up and a tight joint can be formed by the use of a gasket forming an integral part of the opposed faces of the lap.

Figure 1:
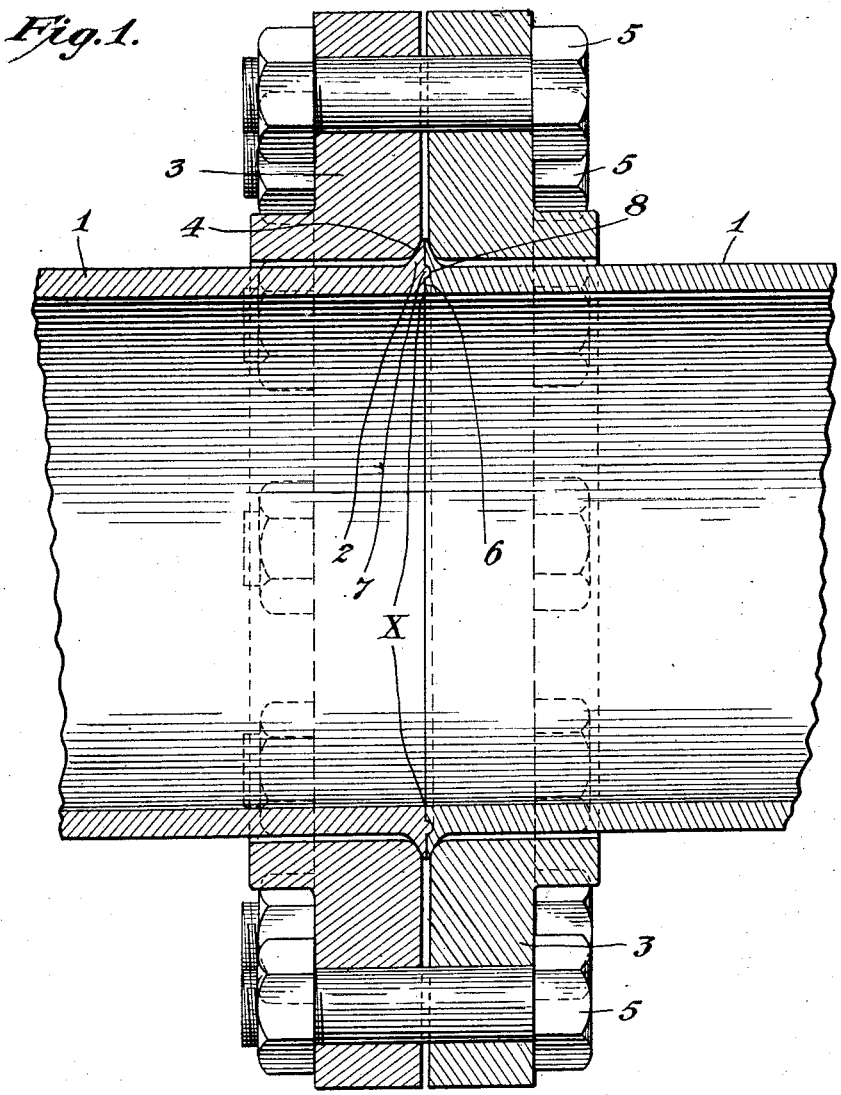
Figure 2:
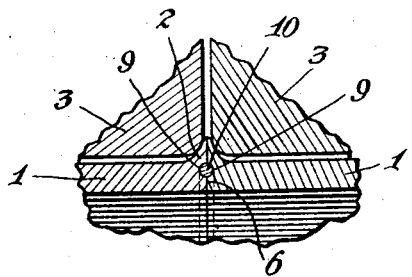

In the accompanying drawings the invention is disclosed in several concrete and preferred forms in which Fig. 1 is a longitudinal sectional view of a pipe joint embodying the invention, Fig. 2 is a view similar to Fig. 1, but showing only a portion thereof, embodying a modified form of the invention.

1 indicates a pipe of ductile material such as iron or steel, the end of which is rolled into a lap 2. It will be noted that, contrary to general practice, this lap is relatively narrow and is in fact a mere circumferential ledge or lip that tapers to a thickness, at its outer circumference, which is less than the thickness of the wall of the pipe. At the same time, a square corner is formed at $x$ thereby increasing the strength of the lap. Loosely mounted on this pipe is a collar 3 having a taper surface 4 engaging the taper surface of the lap. When two such pipe joint members are placed together, there is obtained the construction shown in Fig. 1 where, it will be noted, the collars 3 do not touch each other so that when bolts 5 are tightened the opposed faces 6 of the laps will be brought into close contact. I have found it unnecessary to use the usual gasket although such may be employed if desired. Instead, I produce a tongue and groove construction and this may be obtained, as in Fig. 1, by machining faces 6 and forming an integral tongue 7 on one face and a groove 8 in the other face: or, as shown in Fig. 2, opposed faces 6 may each be provided with a groove 9 and a copper wire 10 may be laid in the grooves.

I claim:

A flange joint comprising: two members, each member consisting of a ductile iron pipe the end of which is rolled over into a narrow tapering lap, the end of each member having a square corner at its inner circumference and the lap having a thickness at its outer circumference less than that of the wall of the pipe, said laps being in engagement with each other; two collars, out of contact with each other, mounted loosely one on one and the other on the other pipe, each having a taper face engaging the taper on the lap; and bolts connecting the collars.

Signed at New York city in the borough of Manhattan, county and State of New York, this 27th day of February 1923.

EDWARD J. HUGHES.